US009951832B2

(12) United States Patent
Crippa et al.

(10) Patent No.: US 9,951,832 B2
(45) Date of Patent: Apr. 24, 2018

(54) FLOATING CALLIPER FOR DISC BRAKE

(75) Inventors: Cristian Crippa, Bergamo (IT); Enrico Ongaretti, Bergamo (IT); Paolo Cesani, Bergamo (IT)

(73) Assignee: FRENI BREMBO S.P.A., Curno Bergamo (IT)

( * ) Notice: Subject to any disclaimer, the term of this patent is extended or adjusted under 35 U.S.C. 154(b) by 0 days.

(21) Appl. No.: 14/116,843

(22) PCT Filed: Apr. 30, 2012

(86) PCT No.: PCT/IB2012/052158
§ 371 (c)(1),
(2), (4) Date: Nov. 11, 2013

(87) PCT Pub. No.: WO2012/156849
PCT Pub. Date: Nov. 22, 2012

(65) Prior Publication Data
US 2014/0097050 A1    Apr. 10, 2014

(30) Foreign Application Priority Data
May 13, 2011    (IT) ............................... PD2011A0154

(51) Int. Cl.
*F16D 55/227*    (2006.01)
*F16D 65/00*    (2006.01)
(Continued)

(52) U.S. Cl.
CPC ....... *F16D 65/0075* (2013.01); *F16D 55/227* (2013.01); *F16D 55/22655* (2013.01); *F16D 2055/0008* (2013.01)

(58) Field of Classification Search
CPC ............. F16D 55/22655; F16D 55/227; F16D 2055/002; F16D 2055/007;
(Continued)

(56) References Cited

U.S. PATENT DOCUMENTS 3,942,611 A * 3/1976 Burnett ...................... 188/73.39
4,191,278 A * 3/1980 Karasudani ................ 188/73.39
(Continued)

FOREIGN PATENT DOCUMENTS

| DE | 3121893 C2 | 12/1982 |
| DE | 19626296 A1 * | 1/1998 |
| DE | 102004045218 A1 | 4/2006 |
| DE | 102005038275 A1 | 2/2007 |
| EP | 0145593 A2 | 6/1985 |
| EP | 0709592 A | 5/1996 |
| EP | 0971144 A2 | 1/2000 |
| FR | 2631405 A1 | 11/1989 |
| GB | 2199909 A | 7/1988 |

OTHER PUBLICATIONS

The International Search Report and Written Opinion dated Jul. 9, 2012.

*Primary Examiner* — Bradley T King
*Assistant Examiner* — Stephen M Bowes
(74) *Attorney, Agent, or Firm* — Thomas Horstemeyer, LLP

(57) ABSTRACT

Floating calliper for disc brake comprising a calliper body and a bracket, wherein the calliper body is suitable for being positioned astride the disc brake, extending from an inner side to an outer side of the calliper, the bracket comprises means of attachment of the calliper for disc brake to a relative support, the calliper body sliding in relation to the bracket in an axial direction, the calliper comprising means of coupling between the calliper body and the bracket, suitable to permit the relative sliding between these parallel to the axial direction. The bracket extends only on the inner side of the calliper and delimits a first seat housing at least a first pad to exert the braking action on an inner side of the disc brake. The calliper body delimits a second seat, axially opposite the first seat, so as to house at least a second pad exerting a braking action on an outer side of the disc brake facing the outer side of the calliper. Advantageously, the coupling means comprise a guide pin and an attachment pin, the guide pin enabling and guiding a relative sliding, in the axial direction, of the calliper body in relation to the bracket and the attachment pin angularly blocking the calliper body (Continued)

on the bracket, preventing its rotation in relation to the guide pin, so that the calliper body is axially guided solely by the guide pin.

20 Claims, 14 Drawing Sheets

(51) Int. Cl.
*F16D 55/2265* (2006.01)
*F16D 55/00* (2006.01)

(58) Field of Classification Search
CPC ..... F16D 2055/0091; F16D 2055/0016; F16D 55/2265; F16D 65/0068; B60T 1/065
See application file for complete search history.

(56) References Cited

U.S. PATENT DOCUMENTS

| | | | | |
|---|---|---|---|---|
| 4,311,219 | A | * | 1/1982 | Watanabe et al. .......... 188/71.8 |
| 4,313,526 | A | * | 2/1982 | Farr ............................ 188/72.4 |
| 4,488,622 | A | | 12/1984 | Stoka |
| 4,630,713 | A | | 12/1986 | Carre et al. |
| 4,632,227 | A | * | 12/1986 | Mery et al. ................. 188/73.32 |
| 4,716,994 | A | * | 1/1988 | Iwamoto ................... B60T 8/52 188/1.11 E |
| 5,205,383 | A | * | 4/1993 | Terashima ................. 188/73.45 |
| 2004/0188191 | A1 | * | 9/2004 | Lintner ...................... 188/73.45 |

* cited by examiner

US 9,951,832 B2

FLOATING CALLIPER FOR DISC BRAKE

CROSS-REFERENCE TO RELATED APPLICATION

This application is the 35 U.S.C. § 371 national stage of PCT application PCT/IB2012/052158 filed Apr. 30, 2012 which claims priority to Italian Patent Application No. PD2011A000154, dated May 13, 2011, both of which are incorporated by reference in their entirety.

FIELD OF THE INVENTION

The present invention relates to a calliper for disc brake, and in particular a floating calliper.

BACKGROUND OF THE INVENTION

In particular, it is known of in the art to make callipers for disc brakes of the floating type wherein the calliper body positions itself astride the disc brake, positioning itself at least partially overhanging the bracket which enables the attachment of the calliper to a fixed support, such as for example a stub axle. The braking action is exerted by thrust means, such as pistons, positioned on one side only of the calliper body, the inside, which press the pad/s against a first braking surface of the associable disc brake, said first braking surface facing towards the inner side of the calliper body.

The calliper body is connected in a floating manner to the bracket: in other words, the calliper body translates axially in relation to the bracket and, in such translation movement, pulls the pads of the outer side against a second braking surface of the disc brake, opposite the first braking surface and facing outwards.

In particular, the calliper body is connected mechanically to the bracket by means of pins which enable the relative sliding between the calliper body and the bracket, while the bracket is rigidly blocked to a relative support of the calliper body, such as for example a stub axle.

The solutions of the prior art have several disadvantages.

In fact, on the one hand there is the need to make a calliper for disc brake which is as light as possible, so as to limit as far as possible the non-suspended masses of the vehicle which the disc brake is joined to and on the other there is the need to ensure the necessary rigidity of the calliper body, to prevent it from deforming with use and jeopardising the braking action.

In particular, any deformations of the calliper body may jeopardise the sliding in relation to the bracket and therefore produce an incorrect distribution of the thrust acting on the pads acting on opposite sides of the braking surface.

Obviously such requirements of rigidity and lightness are antithetic given that the increased rigidity is usually achieved by an increased thickness of the components and of the relative masses.

SUMMARY OF THE INVENTION

The purpose of the present invention is to make a calliper for brake disc which overcomes the drawbacks mentioned with reference to the prior art.

Such drawbacks are resolved by a calliper for brake disc according to claim 1.

BRIEF DESCRIPTION OF THE DRAWINGS

Other embodiments of the calliper for brake disc according to the invention are described in the subsequent claims.

Further characteristics and advantages of the present invention will be more clearly comprehensible from the description given below of its preferred and non-limiting embodiments, wherein.

DETAILED DESCRIPTION OF THE INVENTION

Figure 1:
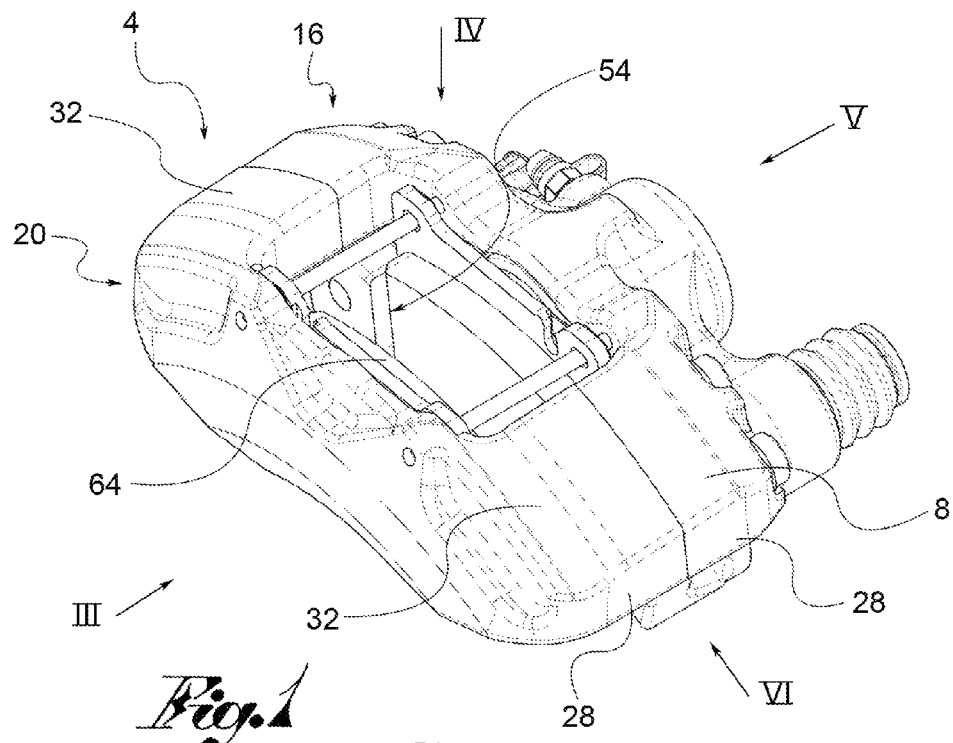
FIGS. 1-2 show perspective views from different angles of a calliper for brake disc according to one embodiment of the present invention.
Figure 2:
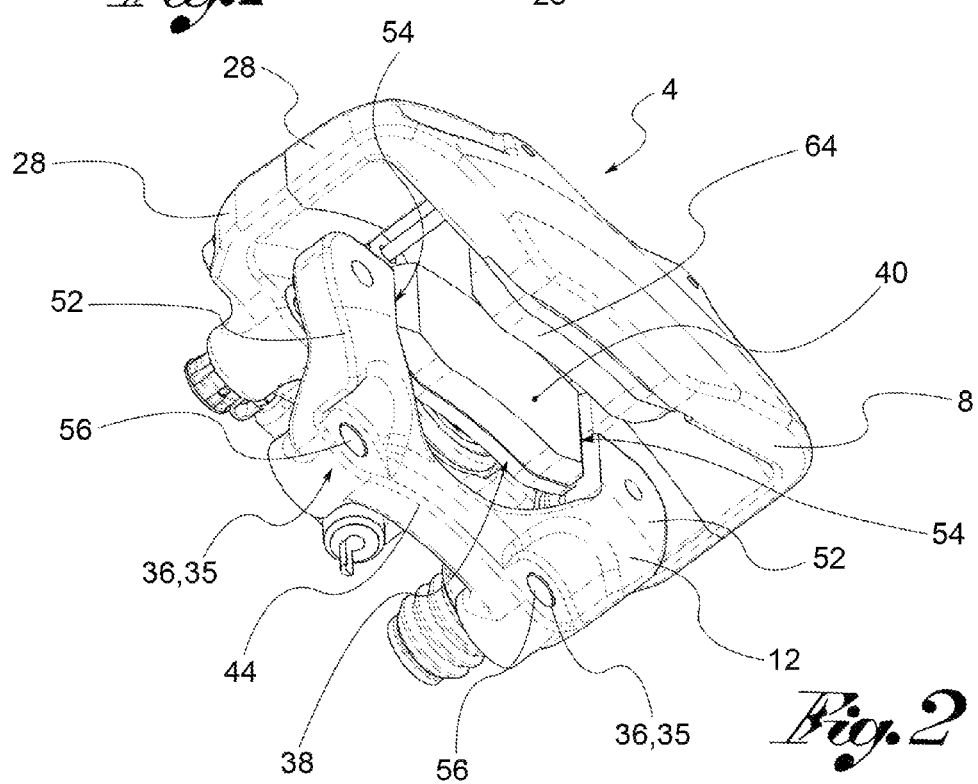
Figure 3:
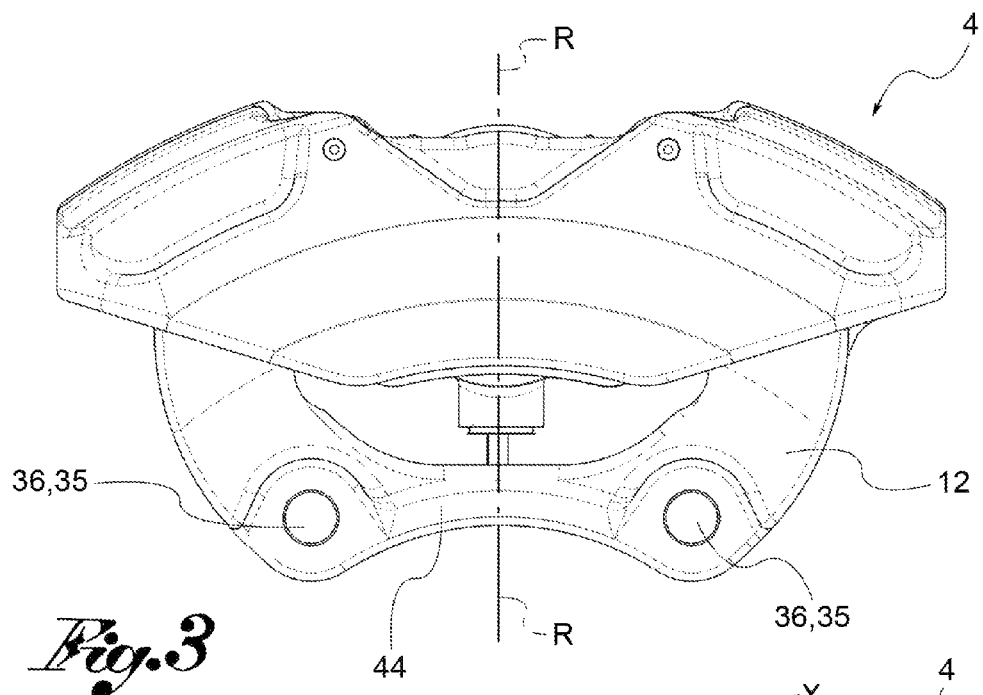
FIG. 3 shows a side view of the calliper in FIG. 1, from the side of the arrow III in FIG. 1.
Figure 4:
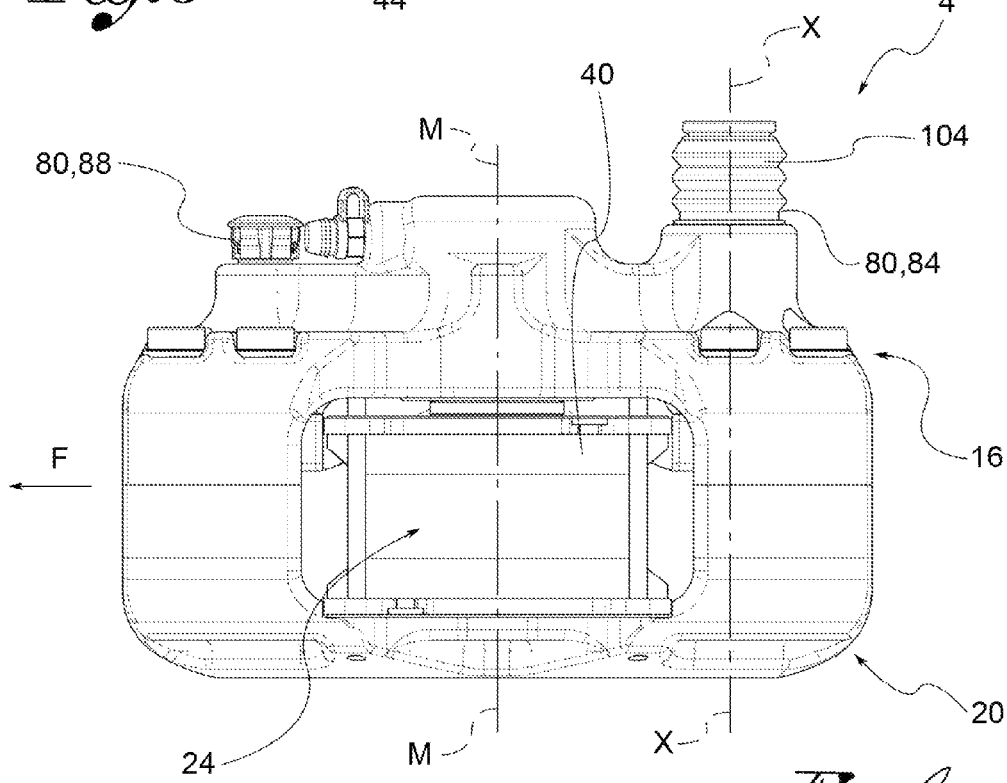
FIG. 4 shows a ground view of the calliper in FIG. 1, from the side of the arrow IV in FIG. 1.
Figure 5:
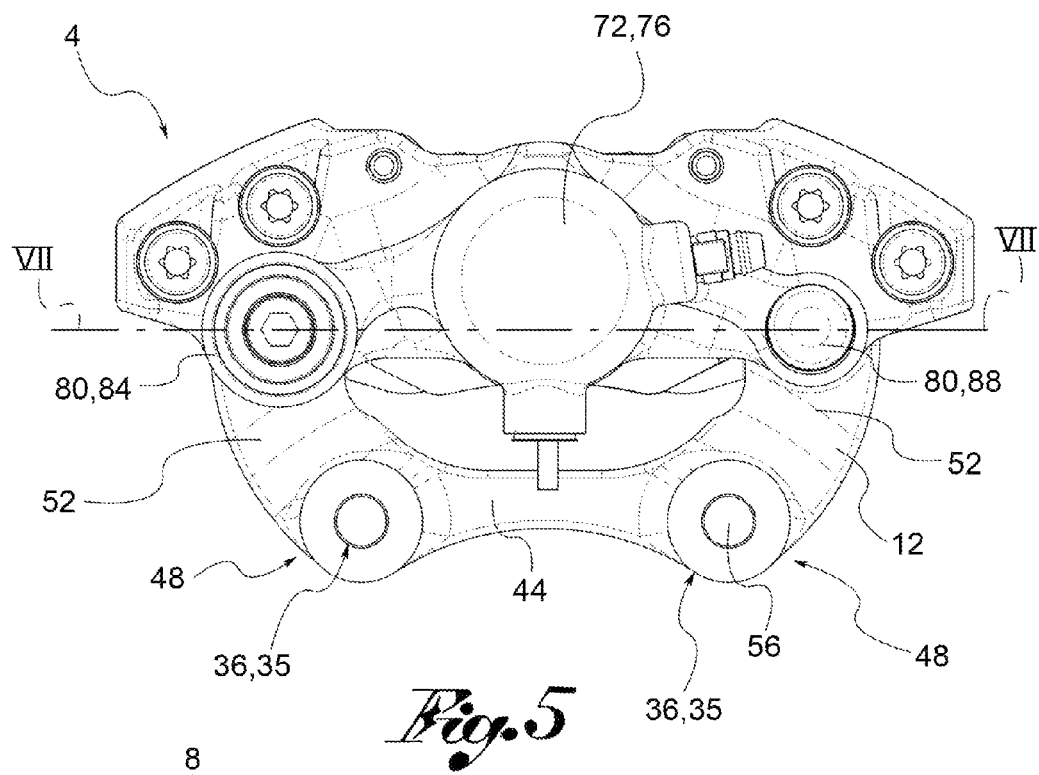
FIG. 5 shows a side view of the calliper in FIG. 1, from the side of the arrow V in FIG. 1.
Figure 6:
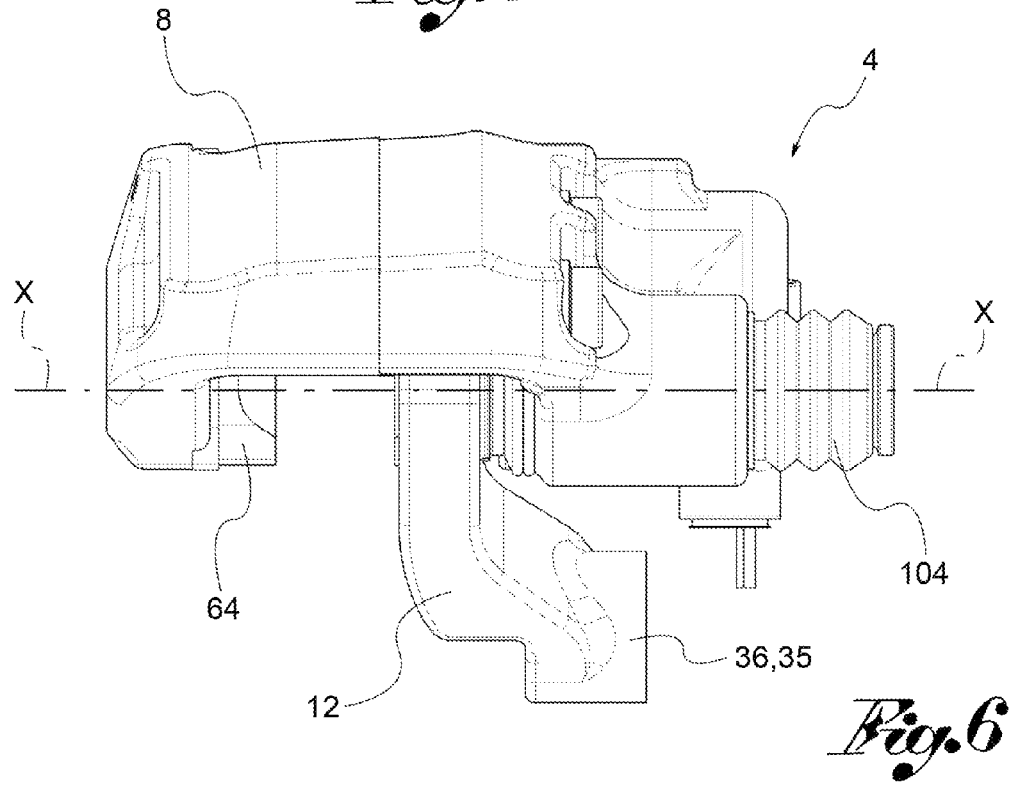
FIG. 6 shows a side view of the calliper in FIG. 1, from the side of the arrow VI in FIG. 1.
Figure 7:
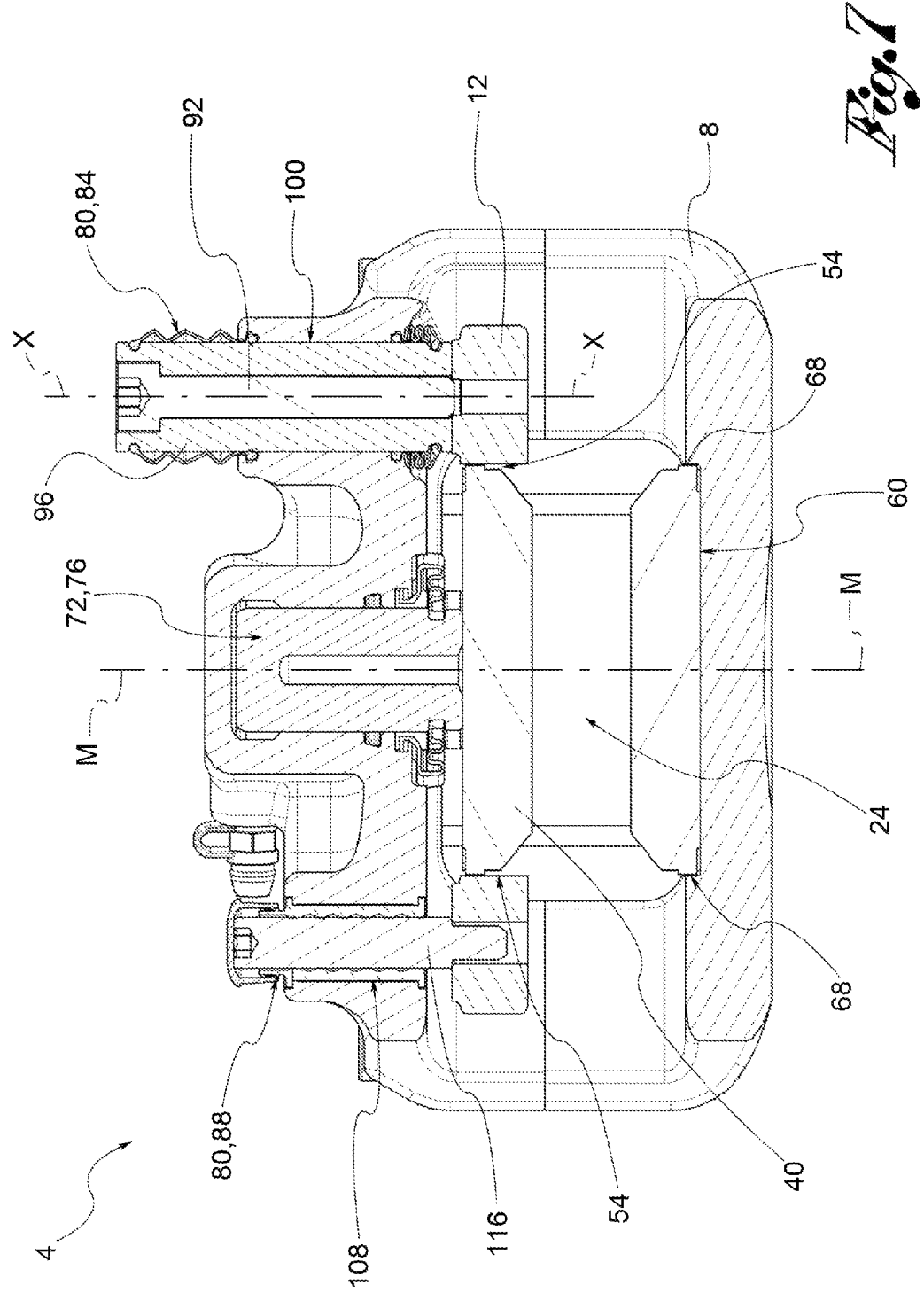
FIG. 7 shows a cross-section view of the calliper in FIG. 1, along the cross-section plane VII-VII in FIG. 5.
Figure 8:
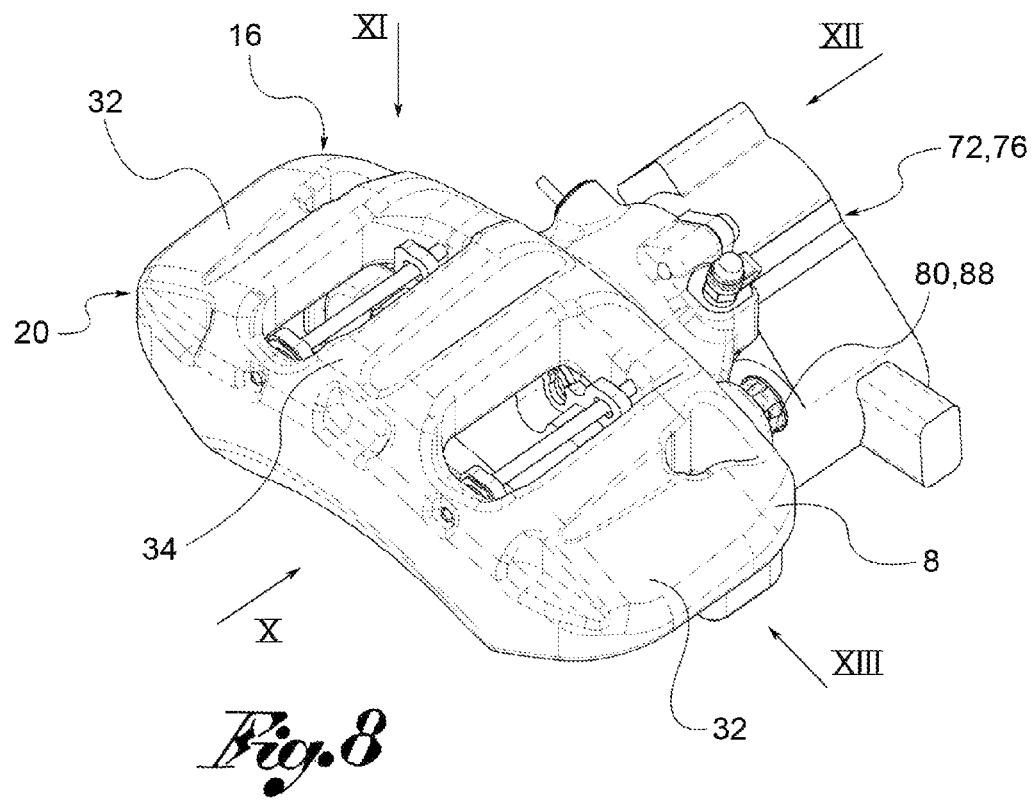
FIGS. 8-9 show perspective views, from different angles, of a calliper for brake disc according to a further embodiment of the present invention.
Figure 9:
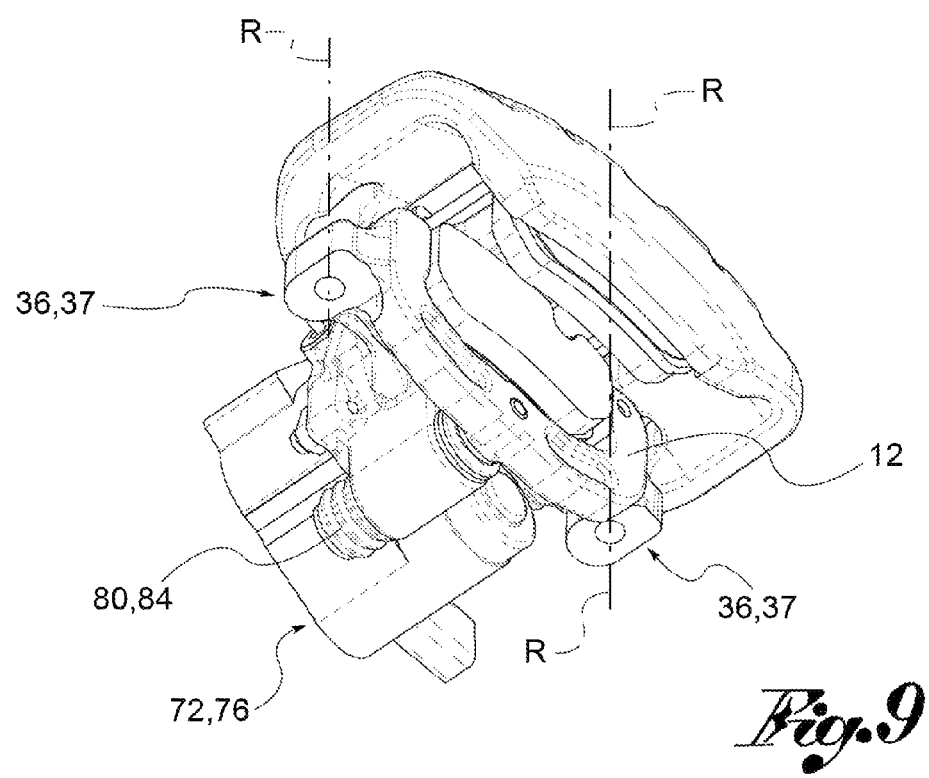
Figure 10:
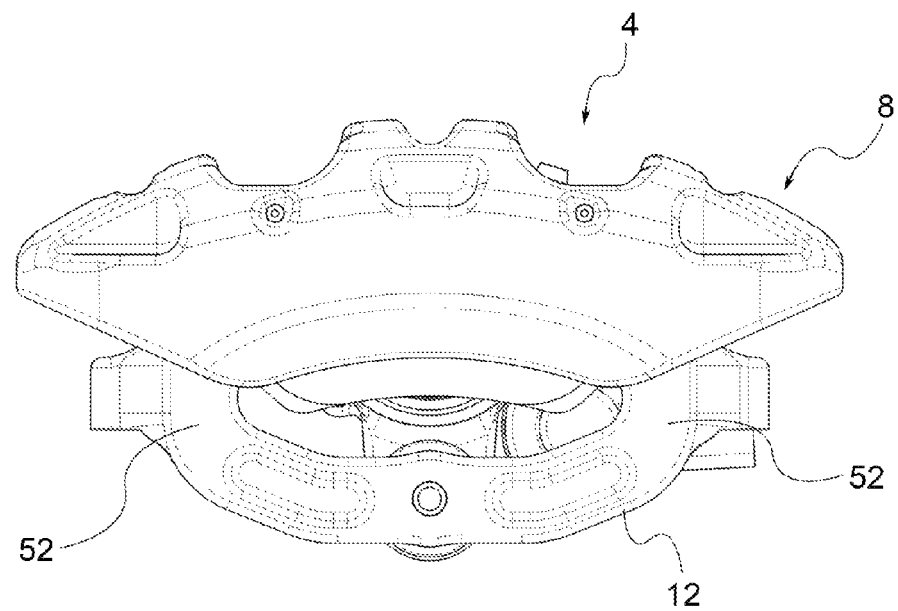
FIG. 10 shows a side view of the calliper in FIG. 8, from the side of the arrow X in FIG. 8.
Figure 11:
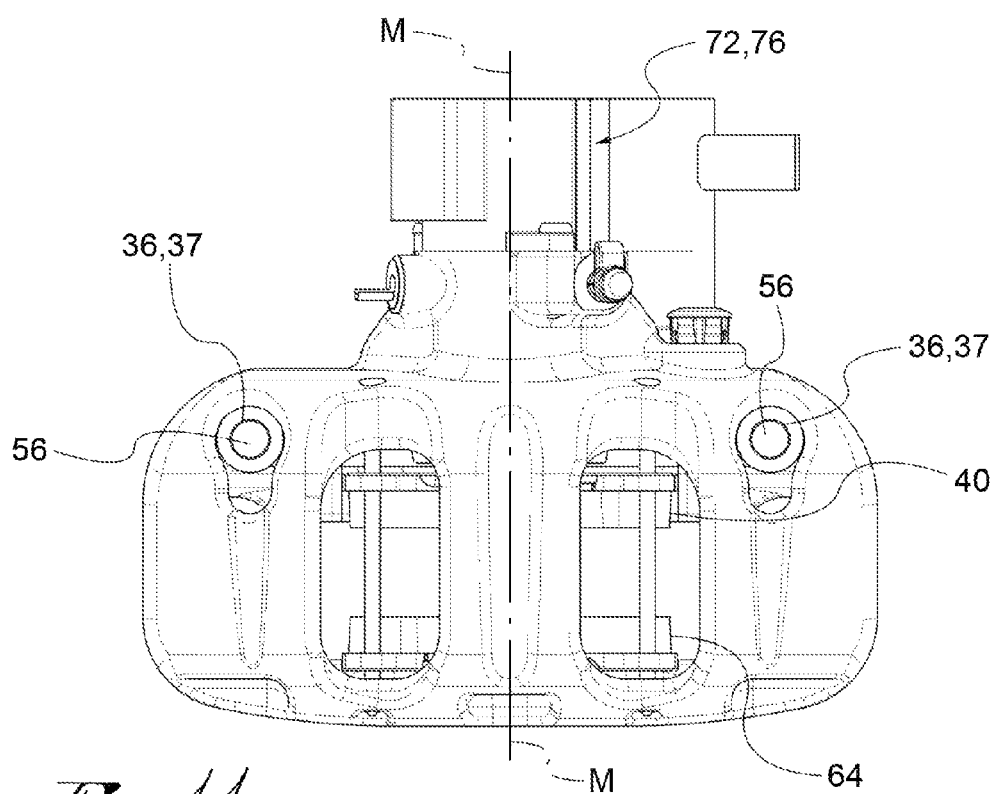
FIG. 11 shows a ground view of the calliper in FIG. 8, from the side of the arrow XI in FIG. 8.
Figure 12:
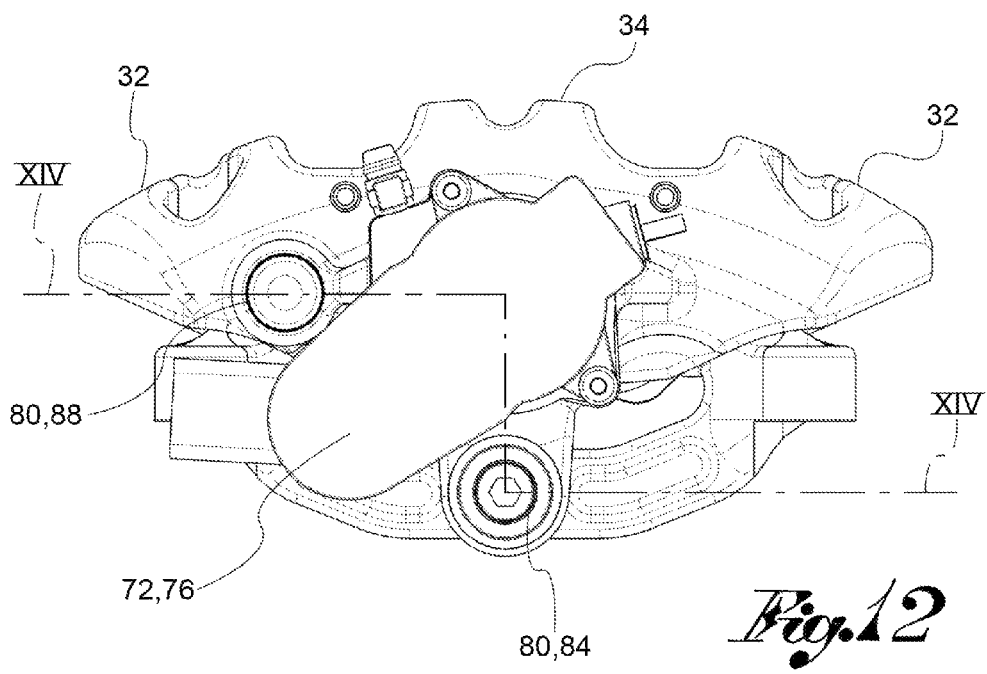
FIG. 12 shows a side view of the calliper in FIG. 8, from the side of the arrow XII in FIG. 8.
Figure 13:
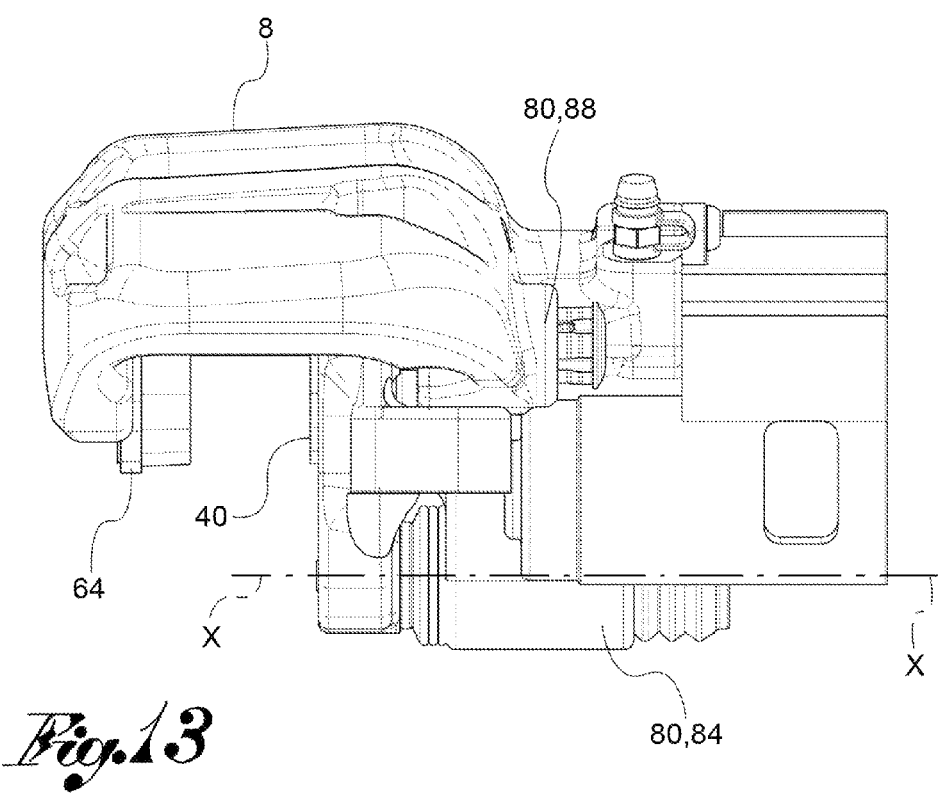
FIG. 13 shows a side view of the calliper in FIG. 8, from the side of the arrow XIII in FIG. 8.
Figure 14:
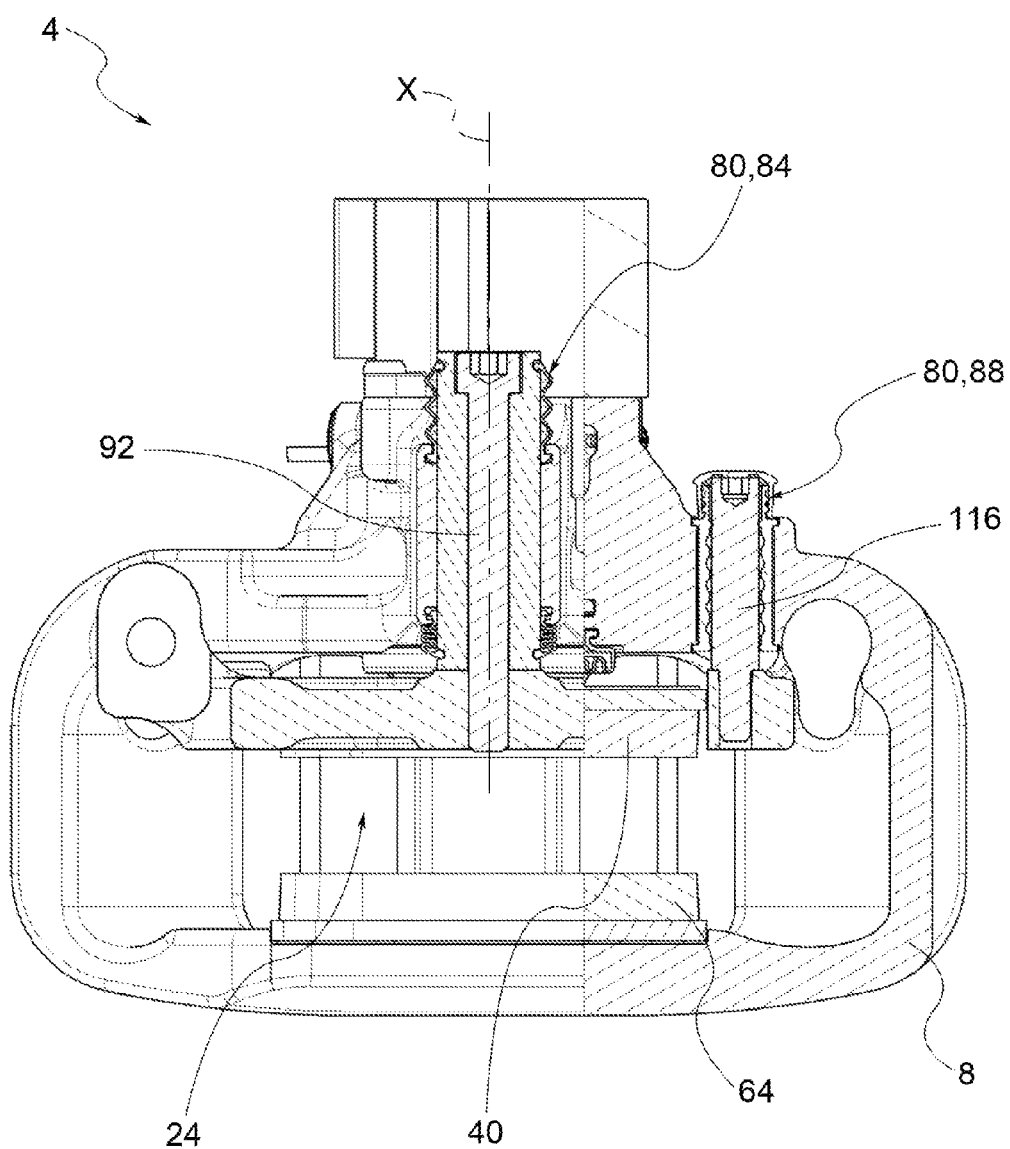
FIG. 14 shows a cross-section view of the calliper in FIG. 8, along the cross-section plane XIV-XIV in FIG. 12.
Figure 15A:
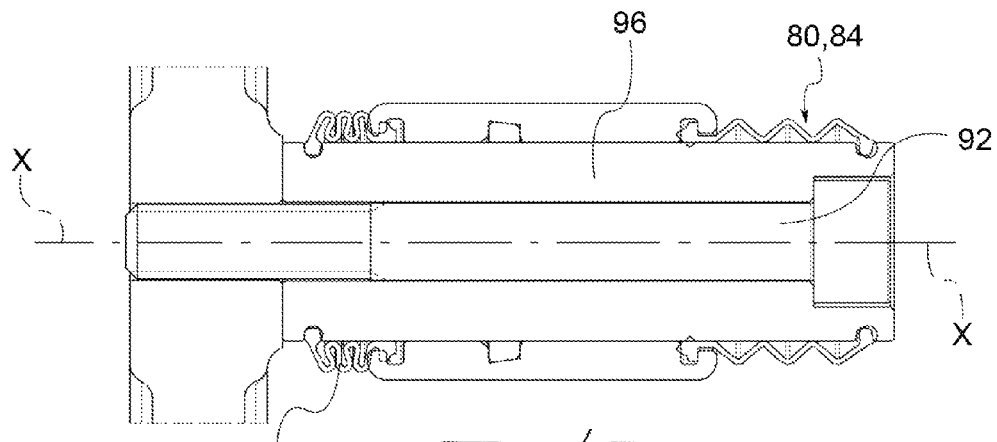
FIGS. 15a-15c show enlarged details of the cross-section in FIG. 14.
Figure 15B:
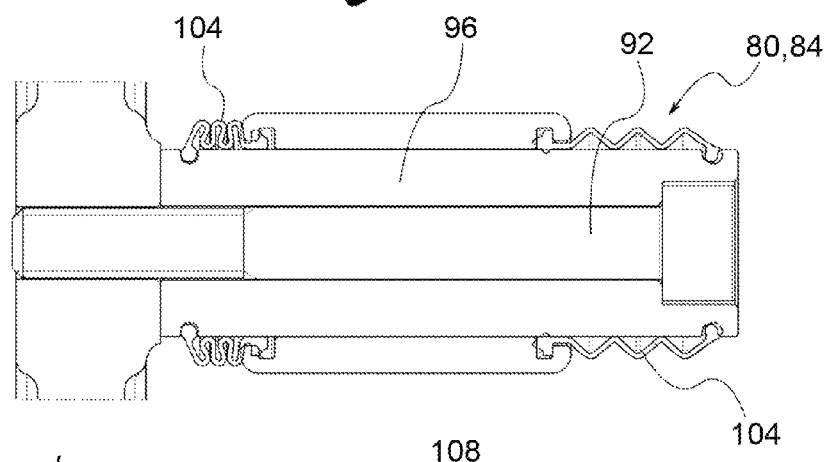
Figure 15C:
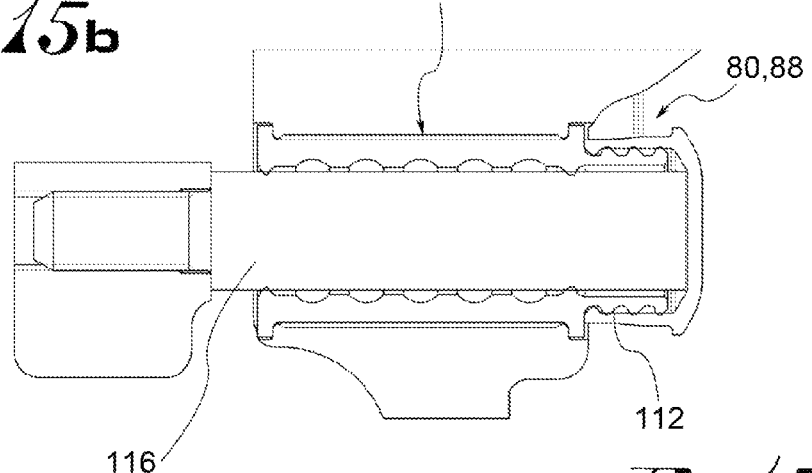
Figure 16:
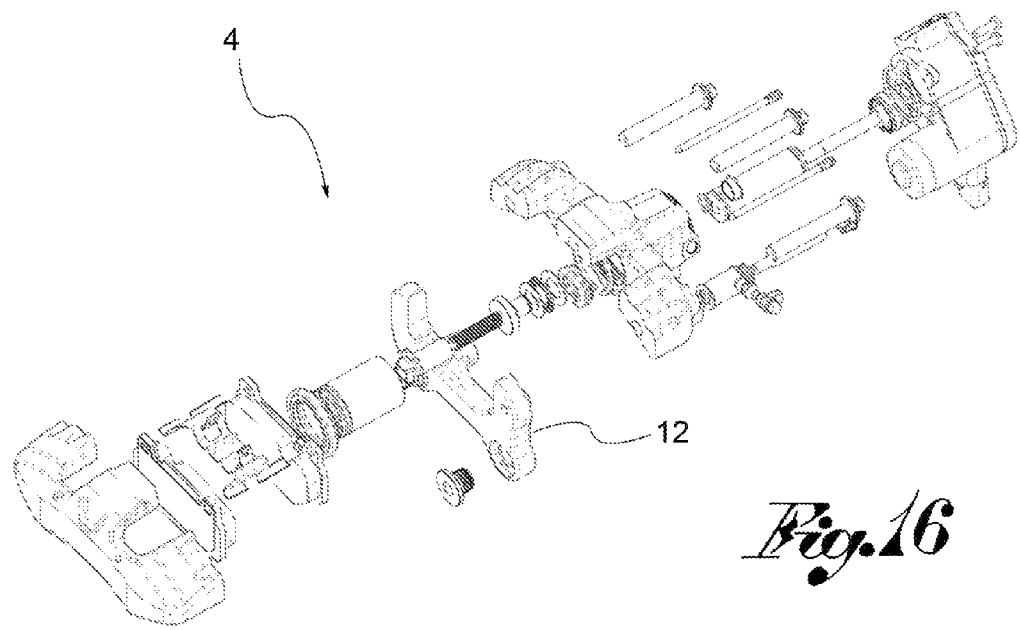
FIG. 16 shows a perspective views, in separate parts, of a calliper for brake disc according to a further embodiment of the present invention.
Figure 17:
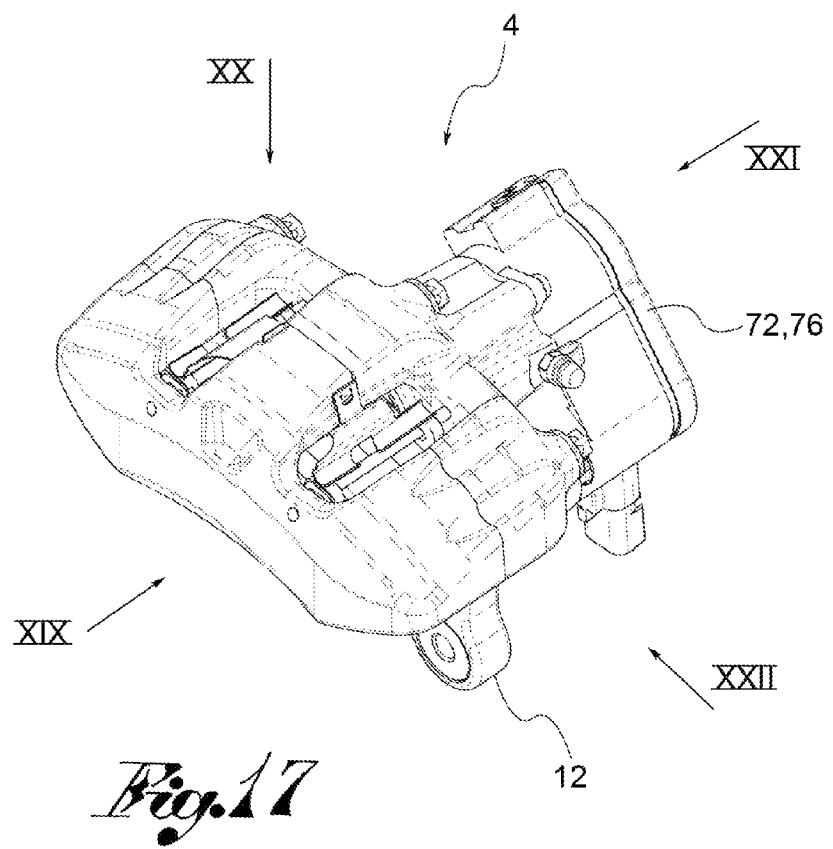
FIGS. 17-18 show perspective views, from different angles, of the calliper for brake disc in FIG. 16 in an assembled configuration.
Figure 18:
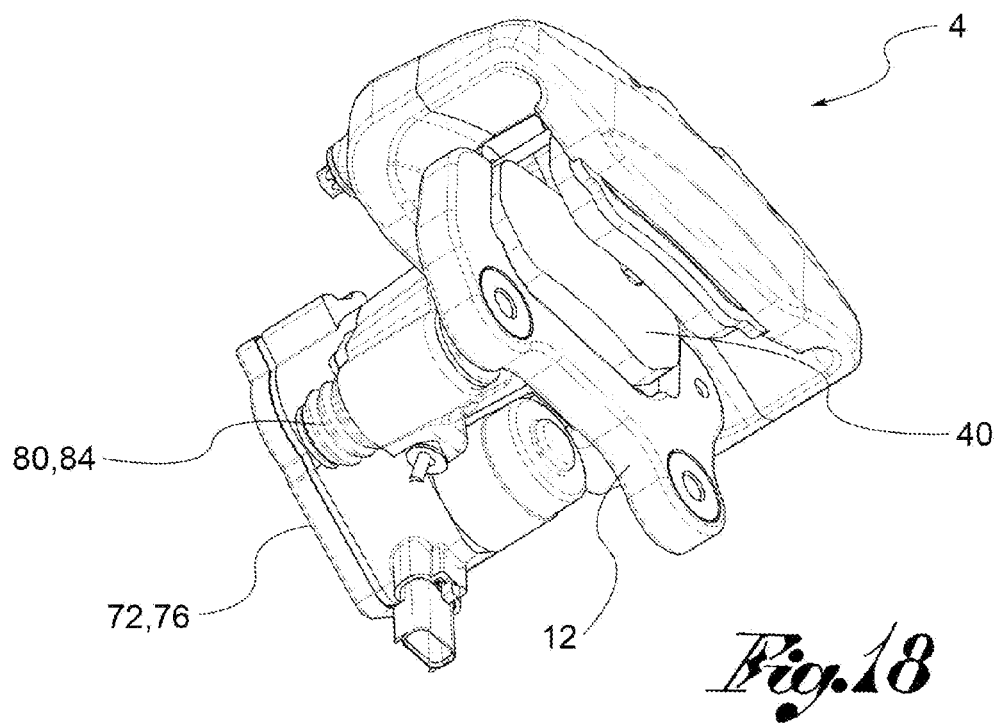
Figure 19:
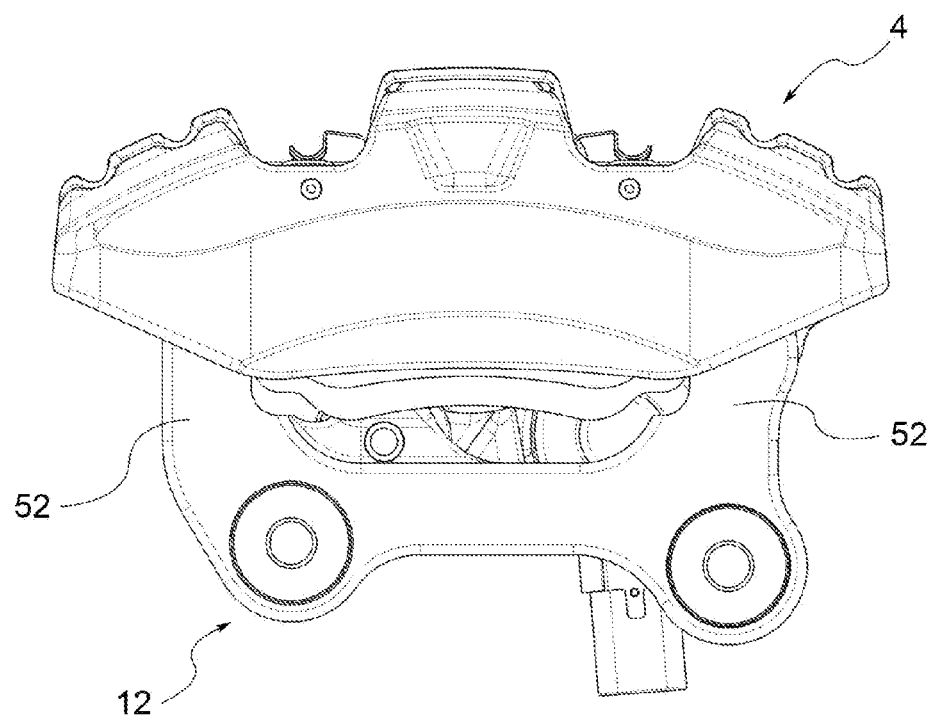
FIG. 19 shows a side view of the calliper in FIG. 16, from the side of the arrow XIX in FIG. 17.
Figure 20:
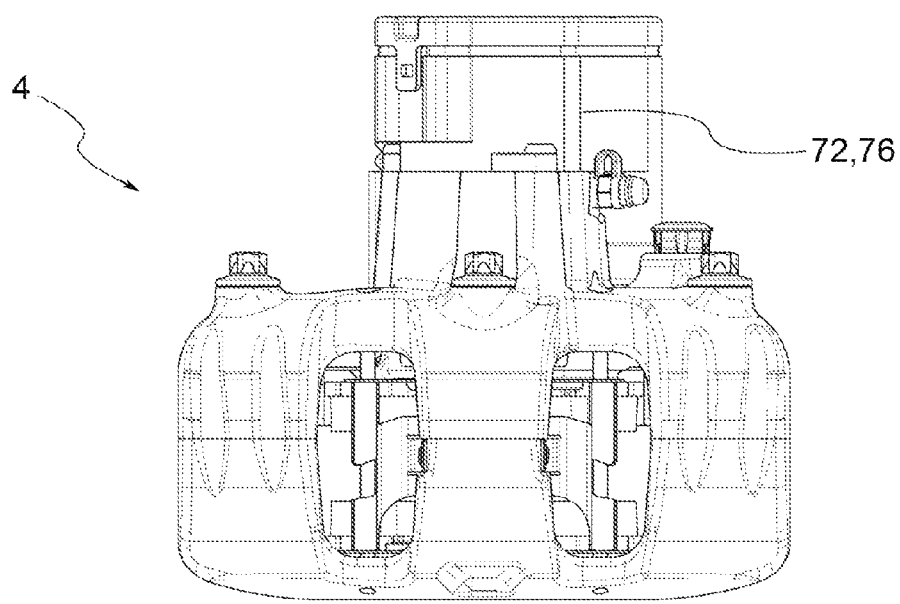
FIG. 20 shows a ground view of the calliper in FIG. 16, from the side of the arrow XX in FIG. 17.
Figure 21:
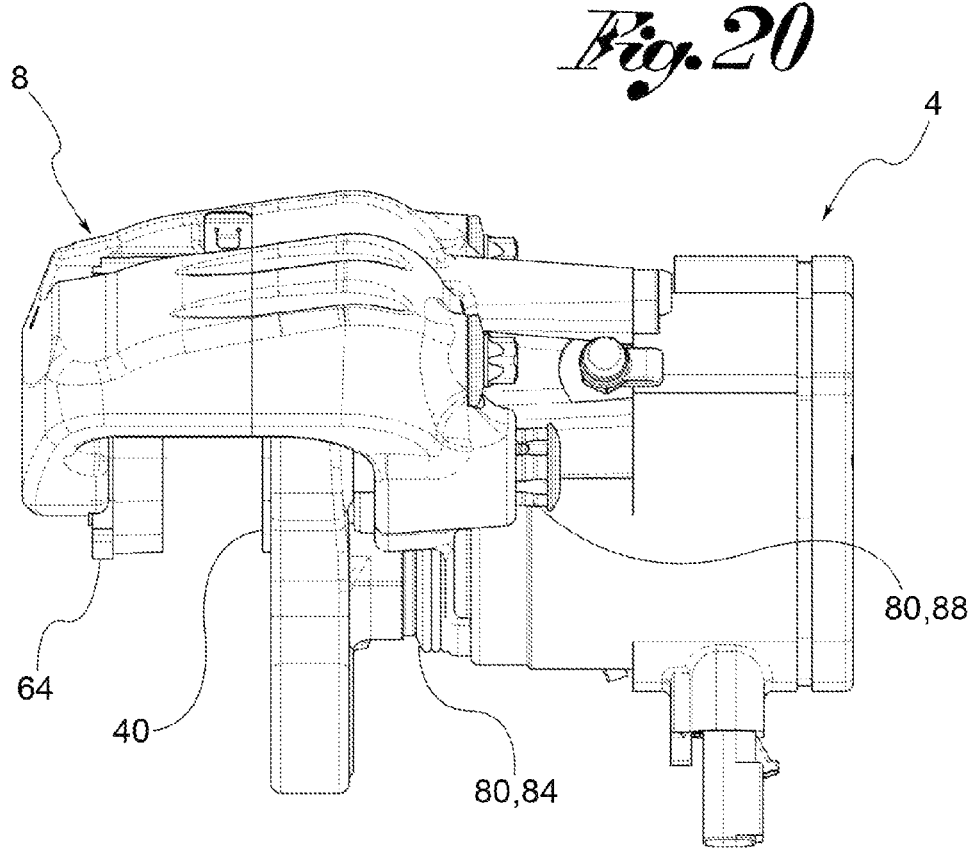
FIG. 21 shows a side view of the calliper in FIG. 16, from the side of the arrow XXI in FIG. 17.
Figure 22:
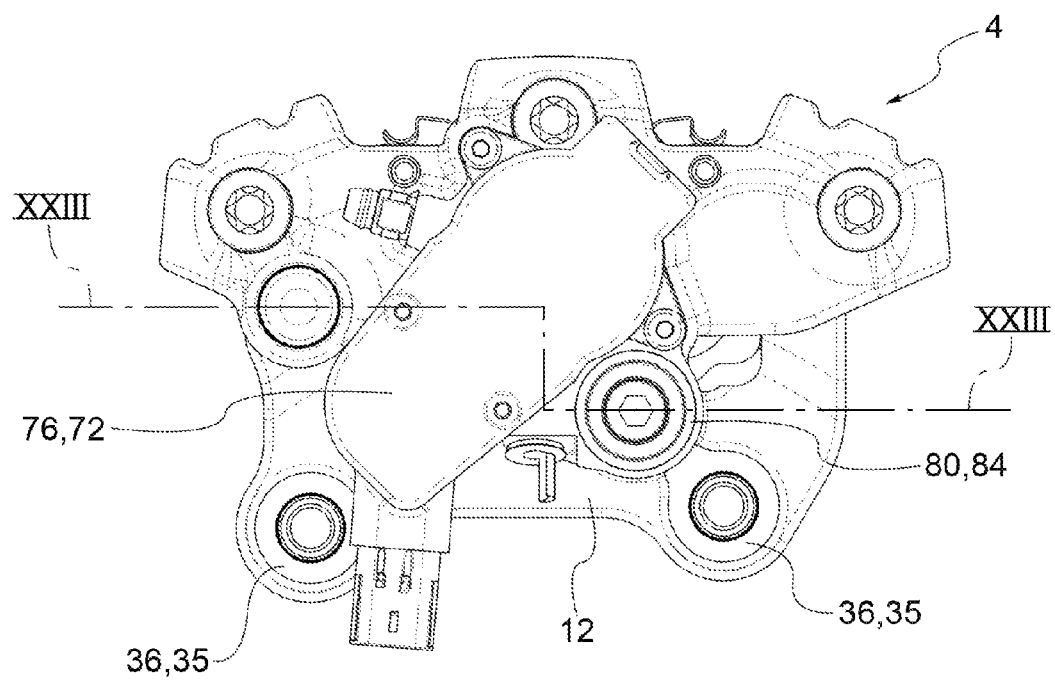
FIG. 22 shows a side view of the calliper in FIG. 16, from the side of the arrow XXII in FIG. 17.
Figure 23:
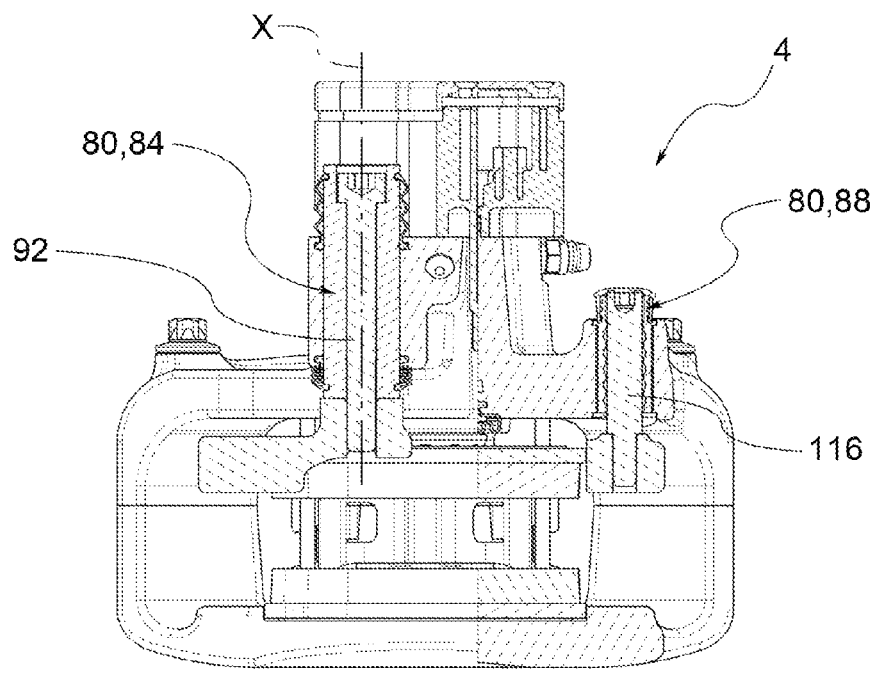
FIG. 23 shows a cross-section view of the calliper in FIG. 16, along the cross-section plane XXIII-XXIII in FIG. 22.
Figure 24A:
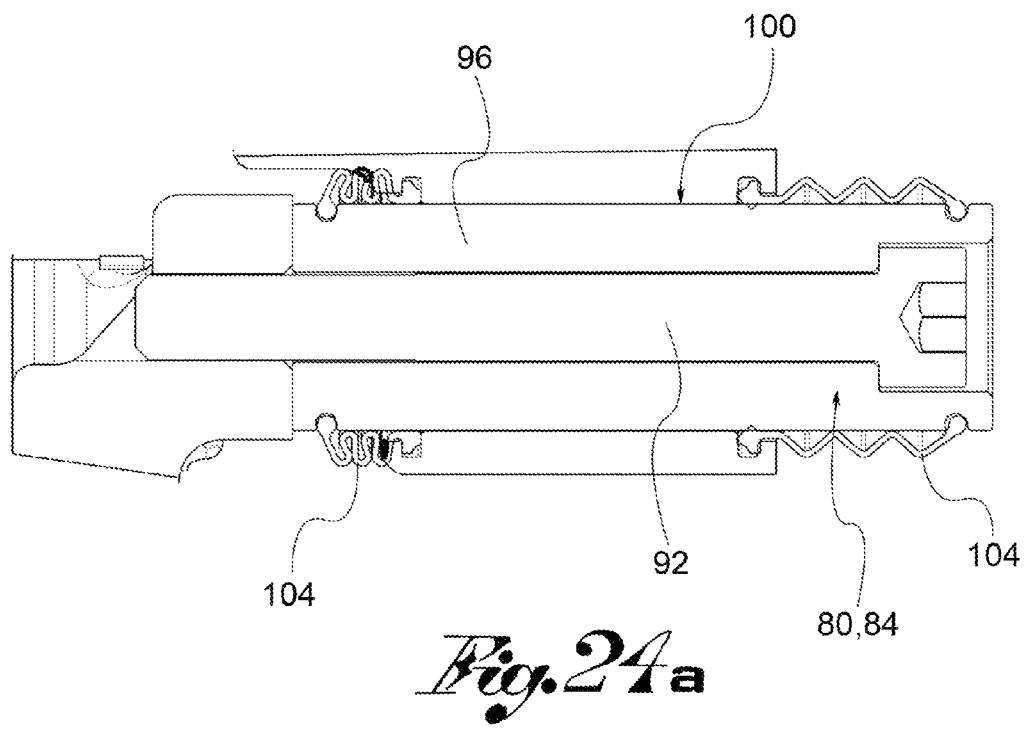
FIGS. 24a-24b show enlarged details of the cross-section in FIG. 23.
Figure 24B:
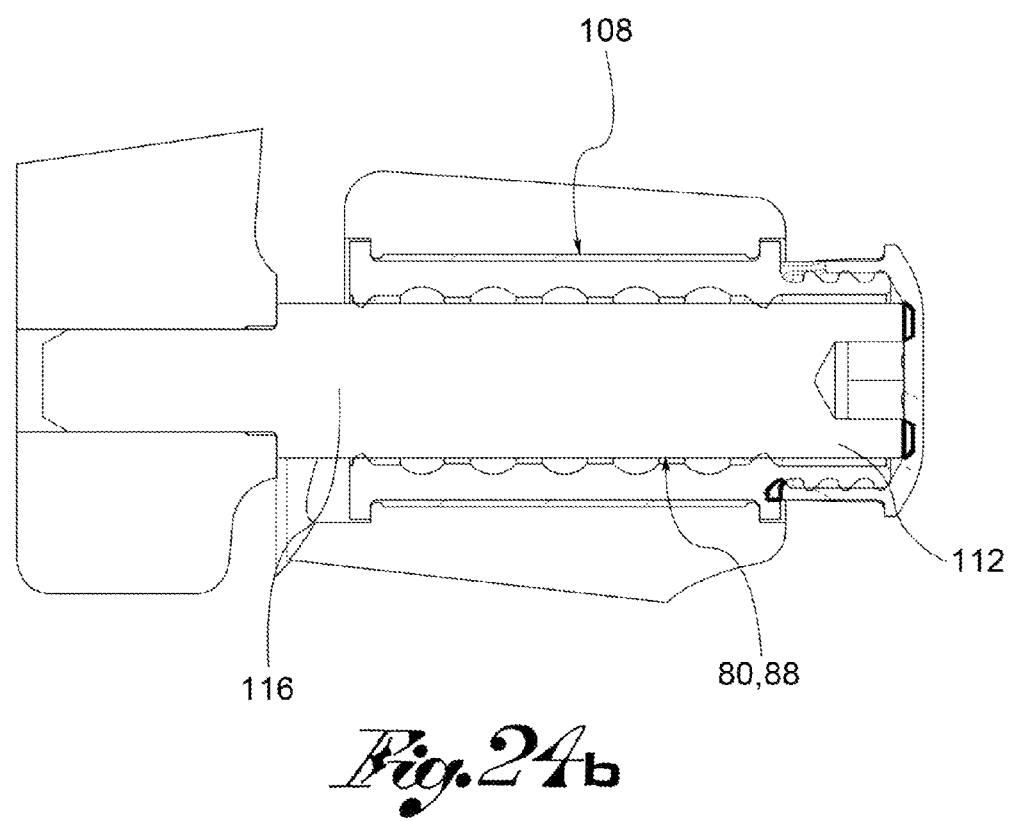

The elements or parts of elements common to the embodiments described below will be indicated using the same reference numerals.

With reference to the aforesaid figures, reference numeral 4 globally denotes a calliper for disc brake associable with a disc brake (not shown), said calliper being of the floating type, as described further below.

The calliper 4 comprises a calliper body 8 and a bracket 12, wherein the calliper body 8 is suitable for being positioned astride the disc brake, extending from an inner side 16 of the calliper 4, at which the calliper is attached to a relative support (not shown), to an outer side 20 of the calliper 4, opposite the inner side 16.

The inner and outer sides 16, 20 are opposite each other in relation to a housing compartment 24 of an associable disc brake, suitable for housing a peripheral portion or braking surface of the disc brake on which to exert the braking action.

The calliper body 8 may be of the monobloc type or may comprise a pair of half-bodies 28 joined to each other by connection means, such as screws.

The calliper body 8 comprises for example a pair of lateral bridges 32 which delimit the angular extension of the calliper body itself, the calliper body may also comprise one or more central bridges 34 which position themselves astride the associable disc brake.

In the floating function, the calliper body 8 floats, that is translates or slides axially in an axial direction X-X to the bracket 12 which is instead fixed and integral with the support of the calliper 4.

The bracket 12 in fact comprises means of attachment 36 of the calliper 4 to a relative support.

According to one embodiment, the means of attachment 36 of the bracket 12 to a relative support of the calliper comprise axial attachment pins and holes 35, directed parallel to said axial direction X-X.

According to a further embodiment, the means of attachment 36 of the bracket 12 to a relative support of the calliper 4 comprise radial attachment pins and holes 37 directed perpendicular to said axial direction X-X, in a radial direction R-R.

The bracket 12 extends only on the inner side 16 of the calliper 4 and delimits a first seat 38 for housing at least a first pad 40 to exert the braking action on an inner side of the disc brake facing the inner side 16 of the calliper 4, the braking forces exchanged by the first pad 40 with the first braking side of the disc brake thereby exerting directly and exclusively on the bracket 12.

According to one embodiment, the bracket 12 has an overall "U" shape, having a cross-member 44 and, at opposite lateral ends 48 of said cross-member 44, a pair of uprights 52, the cross-member 44 and the uprights 52 delimiting said first seat 38 to house the first pad 40.

Each upright 52 interfaces in contact with a lateral rim 54 of said first pad 40, so as to receive the braking forces transmitted by said first pad 40.

According to one embodiment, housing holes 56 of said means of attachment 36 of the bracket 12 to the relative support of the calliper 4 are made on said cross-member 44.

Preferably, said bracket 12 is made of aluminium or of an aluminium alloy.

The calliper body 8 delimits a second seat 60, axially opposite the first seat 38, so as to house at least a second pad 64 exerting a braking action on an outer side of the disc brake facing the outer side 20 of the calliper 4; the braking forces exchanged by the second pad 64 with the second braking side thereby exerting directly on the calliper body 8.

According to one embodiment, the calliper body 8 comprises a pair of shoulders 68 on the outer side 20 which define the second seat 60 for housing the second pad 64.

Said shoulders 68 abut against the lateral rims 54 of said second pad 64, so as to receive and transmit the braking forces transmitted by said second pad 64 to the calliper body 8.

The calliper body 8 further comprises thrust means 72 for pushing the pads 40, 64 against the associable disc brake, said thrust means 72 being positioned on the inner side 16 of the calliper 4.

The thrust means 72 act directly on the first pad 40; the floating movement of the calliper body 8 also exerts a corresponding thrust action on the second pad 64 (in a known manner).

Said thrust means 72 comprise at least one piston 76; the piston 76 may be hydraulically and/or electrically-operated and may act both as foot brake or as hand brake.

Advantageously, the calliper 4 comprises means of coupling 80 between the calliper body 8 and the bracket 12, suitable to permit the relative sliding between these parallel to the axial direction X-X.

According to one embodiment, the means of coupling 80 comprise a guide pin 84 and an attachment pin 88.

In particular, the guide pin 84 enables and guides a relative sliding, in the axial direction X-X, of the calliper body 8 in relation to the bracket 12, and the attachment pin 88 angularly blocks the calliper body 8 on the bracket 12, preventing its rotation in relation to the guide pin 84, so that the calliper body 8 is axially guided solely by the guide pin 84.

According to one embodiment, the uprights 52 of the bracket 12 house the coupling means 80 of the calliper body 8 and the bracket 12 at least partially.

For example, the coupling means 80 comprise a guide pin 84 passing at least partially through the inner side 16 of the calliper body 8 and, at least partially, through an upright 52 of the bracket 12.

The guide pin 84 comprises a core 92 which engages at least partially in the bracket 12, and which is at least partially surrounded by a calibrated sliding bush 96; in other words the sliding bush is mounted coaxially to said guide pin 84.

The sliding bush 96 engages inside a corresponding calibrated guide hole 100 made on the calliper body 8, so as to realise the translatory coupling between the calliper body 8 and the bracket 12.

Preferably, said guide pin 84 is made of aluminium or of an aluminium alloy.

Preferably, the guide pin 84 comprises protective bellows or gaskets 104 at opposite axial ends to prevent the infiltration of dust or dirt which could contrast the floating movement of the calliper body 8 in relation to the bracket 12.

The coupling means 80 comprise an attachment pin 88 mechanically separate from the guide pin 84, so as to prevent the rotation of the calliper body 8 in relation to bracket 12, around the guide pin 84, the attachment pin 88 engaging in an attachment hole 108; the coupling between the attachment pin 88 and the attachment hole 108 is a free coupling so as not to influence the axial translation movement guided only by the guide pin 84.

In other words, a single pin, that is the guide pin 84, guides and supports the axial movement of the calliper body 8 in relation to the bracket 12; such movement is in no way prevented by the attachment pin which in no way influences the translation movement of the calliper body 8. The braking forces exchanged between the pads and the disc brake and therefore transmitted from the pads to the calliper body 8, would tend to make the calliper body 8 rotate in relation to the guide pin 8; such rotation is prevented by the attachment pin 88.

According to one embodiment, the attachment pin 88 comprises a locking head 112 and a stem 116 at last partially screwed into the bracket 12, the locking head 112 being operable from the inner side 16 of the calliper body 8, so as to allow the extraction of the attachment pin 88 and the rotation of the calliper body 8 around the guide pin 84 to perform replacement operations of the pads 40, 64 without dismantling the calliper 8 from the relative support.

According to one embodiment, the guide pin 84 and the attachment pin 88 are mounted on respective opposite uprights 52 of the bracket 12.

According to one embodiment, a direction of advancement F of the vehicle being established, the guide pin 84 is positioned upstream of the first pad 40 while the attachment pin 88 is positioned downstream of the first pad 40.

According to a further embodiment, the guide pin 84 is positioned in an aligned position with the thrust means 72 acting on the pads, in a radial direction R-R perpendicular to said axial direction X-X.

In other words, an axis of symmetry of the guide pin 84 is aligned radially with an axis of symmetry of the piston 76 of the thrust means 72.

According to one embodiment, the guide pin 84 engages in a relative guide hole 100 made on a cross-member 44 of the bracket 12.

According to a further embodiment, a direction of advancement F of the vehicle and a centreline plane M-M, parallel to said axial direction X-X and passing through the centreline of the housing compartment 24 of the disc brake being established, the guide pin 84 is positioned downstream of said centreline plane M-M while the attachment pin 88 is positioned upstream of said centreline plane M-M.

As may be appreciated from the description the calliper for disc brake according to the invention makes it possible to overcome the drawbacks of the prior art.

In fact, the deformation of the calliper is first of all controlled by distributing the braking forces exchanged between the disc brake and the pads. In particular, the pads on the outer side exert their forces exclusively on the calliper body, while the pads on the inner side exert the braking forces directly on the bracket.

This specific distribution of the forces makes it possible to make the bracket and/or the calliper body from lighter and less resistant materials than steel, such as aluminium and its alloys.

Moreover, the use of a single guide pin facilitates the relative sliding of the calliper body in relation to the bracket preventing the sticking typical of floating calliper solutions with two guide pins.

Moreover, the reciprocal positioning of the guide and attachment pins on the calliper body in relation to the direction of advancement favours the relative sliding of the calliper body and prevents possible sticking of the same in relation to the bracket.

A person skilled in the art may make numerous modifications and variations to the calliper for disc brake described above so as to satisfy contingent and specific requirements while remaining within the sphere of protection of the invention as defined by the following claims.

The invention claimed is:

1. A calliper for a disc brake, said calliper being a floating calliper and comprising a calliper body and a bracket,
   wherein the calliper body is suitable for being positioned astride the disc brake, the calliper body extending from an inner side of the calliper, at which the calliper is attached to a relative support, to an outer side of the calliper, opposite the inner side, said inner and outer sides being opposite each other in relation to a housing compartment of the disc brake, suitable to house a peripheral portion of the disc brake on which to exert a braking action,
   wherein the bracket comprises means of attachment of the calliper to a relative support,
   the calliper body sliding in relation to the bracket in an axial direction,
   the calliper comprising coupling means between the calliper body and the bracket, the coupling means suitable to enable the relative sliding between the calliper body and the bracket parallel to the axial direction, and thrust means suitable to exert a thrust of relative pads on the disc brake,
   wherein
   the bracket extends only on the inner side of the calliper and delimits a first seat housing at least a first pad to exert the braking action on an inner side of the disc brake facing the inner side of the calliper, braking forces exchanged by the first pad with the first braking side exerting directly and exclusively on the bracket,
   wherein the calliper body delimits a second seat, axially opposite the first seat so as to house at least a second pad exerting a braking action on an outer side of the disc brake facing the outer side of the calliper, the braking forces exchanged by the second pad with the second braking side exerting directly on the calliper body,
   wherein the coupling means comprise a guide pin and an attachment pin, the guide pin enabling and guiding a relative sliding, in the axial direction, of the calliper body in relation to the bracket and the attachment pin angularly blocking the calliper body on the bracket, preventing rotation of the calliper body in relation to the guide pin, wherein the calliper body is axially guided by the guide pin,
   wherein the coupling means comprise a guide pin passing at least partially through the inner side of the calliper body and, at least partially, through an upright of the bracket, said guide pin comprising a core which engages at least partially in the bracket, at least partially surrounded by a calibrated sliding bush, said calibrated sliding bush engaging inside a corresponding calibrated guide hole made on the calliper body, so as to realise a translatory coupling between the calliper body and the bracket,
   wherein the guide pin is positioned radially inward with respect to the thrust means and oriented axially in an aligned position with the thrust means acting on the pads.

2. The calliper for disc brake according to claim 1, wherein the means of attachment of the bracket to a relative support of the calliper comprise radial attachment pins and holes directed perpendicular to said axial direction, in a radial direction.

3. The calliper for disc brake according to claim 1, wherein the bracket has an overall "U" shape, having a cross-member and, at opposite lateral ends of said cross-member, a pair of uprights, the cross-member and the uprights delimiting said first seat to house the first pad.

4. The calliper for disc brake according to claim 3, wherein each upright interfaces in contact with a lateral rim of said first pad, so as to receive the braking forces transmitted by said first pad.

5. The calliper for disc brake according to claim 3, wherein housing holes of said means of attachment of the bracket to the relative support of the calliper are made on said cross-member.

6. The calliper for disc brake according to claim 3, wherein said uprights of the bracket house the coupling means of the calliper body and the bracket at least partially.

7. The calliper for disc brake according to claim 1, wherein said bracket is made from aluminium or an aluminium alloy.

8. The calliper for disc brake according to claim 1, wherein the calliper body, comprises a pair of shoulders on the outer side which define the second seat housing the second pad.

9. The calliper for disc brake according to claim 8, wherein said shoulders abut against the lateral rims of said second pad, so as to receive and transmit the braking forces transmitted by said second pad to the calliper body.

10. The calliper for disc brake according to claim 1, wherein the calliper body comprises the thrust means pushing the pads against the disc brake, said thrust means being positioned on the inner side of the calliper.

11. The calliper for disc brake according to claim 1, wherein said thrust means comprise at least one hydraulically or electrically-operated piston.

12. The calliper for disc brake according to claim 1, wherein said guide pin is made from aluminium.

13. The calliper for disc brake according to claim 1, wherein the guide pin comprises protective bellows or gaskets at opposite axial ends.

14. The calliper for disc brake according to claim 1, wherein the coupling means comprise an attachment pin mechanically separate from the guide pin, so as to prevent the rotation of the calliper body in relation to the bracket, around the guide pin, the attachment pin engaging in an attachment hole according to a free coupling so as not to influence axial translation movement of the calliper body guided only by the guide pin.

15. The calliper for disc brake according to claim 14, wherein the attachment pin comprises a locking head and a stem at last partially screwed into the bracket, the locking head being operable from the inner side of the calliper body so as to allow extraction of the attachment pin and the rotation of the calliper body around the guide pin to perform replacement operations of the pads without dismantling the calliper from the relative support.

16. The calliper for disc brake according to claim 14, wherein the guide pin and the attachment pin are mounted on respective opposite uprights of the bracket.

17. The calliper for disc brake according to claim 1, wherein the guide pin engages in a relative guide hole made on a cross-member of the bracket.

18. The calliper for disc brake according to claim 1, wherein the means of attachment of the bracket to a relative support of the calliper comprise axial attachment pins and holes directed parallel to said axial direction.

19. The calliper for disc brake according to claim 1, wherein, a direction of advancement of a vehicle to which the calliper is applied being established, the guide pin is positioned upstream of the first pad while the attachment pin is positioned downstream of the first pad.

20. The calliper for disc brake according to claim 1, wherein, a direction of advancement of a vehicle to which the calliper is applied and a centreline plane parallel to said axial direction and passing through the centreline of the housing compartment of the disc brake being established, the guide pin is positioned downstream of said centreline plane while the attachment pin is positioned upstream of said centreline plane.

* * * * *